United States Patent
Bertani et al.

(10) Patent No.: US 7,093,019 B1
(45) Date of Patent: Aug. 15, 2006

(54) METHOD AND APPARATUS FOR PROVIDING AN AUTOMATED LOGIN PROCESS

(75) Inventors: John A. Bertani, Corvallis, OR (US); John M. Kerr, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 889 days.

(21) Appl. No.: 09/718,583

(22) Filed: Nov. 21, 2000

(51) Int. Cl.
*G06F 15/16* (2006.01)

(52) U.S. Cl. .................. 709/229; 709/203; 713/200; 713/201; 726/4; 726/27

(58) Field of Classification Search .............. 709/225, 709/226, 227, 216, 219, 229; 726/4, 27; 713/200, 201
See application file for complete search history.

(56) References Cited

U.S. PATENT DOCUMENTS

| | | | | |
|---|---|---|---|---|
| 5,708,780 A | * | 1/1998 | Levergood et al. ......... | 709/229 |
| 5,818,936 A | * | 10/1998 | Mashayekhi ................ | 713/167 |
| 5,823,879 A | * | 10/1998 | Goldberg et al. ............ | 463/42 |
| 5,841,970 A | * | 11/1998 | Tabuki ......................... | 726/2 |
| 5,898,780 A | * | 4/1999 | Liu et al. .................... | 713/155 |
| 5,948,064 A | * | 9/1999 | Bertram et al. ............. | 709/225 |
| 6,047,268 A | | 4/2000 | Bartoli et al. ................ | 705/35 |
| 6,052,785 A | * | 4/2000 | Lin et al. ........................ | 726/5 |
| 6,073,241 A | * | 6/2000 | Rosenberg et al. ......... | 713/201 |
| 6,081,900 A | * | 6/2000 | Subramaniam et al. ....... | 726/19 |
| 6,092,196 A | * | 7/2000 | Reiche ........................... | 726/6 |
| 6,101,482 A | | 8/2000 | DiAngelo et al. ............ | 705/26 |
| 6,157,953 A | * | 12/2000 | Chang et al. ................ | 709/225 |
| 6,161,185 A | * | 12/2000 | Guthrie et al. .............. | 713/201 |
| 6,226,752 B1 | * | 5/2001 | Gupta et al. ................. | 713/201 |
| 6,237,037 B1 | * | 5/2001 | Larsson ....................... | 709/229 |
| 6,339,423 B1 | * | 1/2002 | Sampson et al. ........... | 715/854 |
| 6,385,651 B1 | * | 5/2002 | Dancs et al. ................. | 709/227 |
| 6,397,250 B1 | * | 5/2002 | Clarke ......................... | 709/225 |
| 6,463,474 B1 | * | 10/2002 | Fuh et al. .................... | 709/225 |
| 6,466,966 B1 | * | 10/2002 | Kirsch et al. ................ | 709/203 |
| 6,510,236 B1 | * | 1/2003 | Crane et al. ................. | 382/116 |
| 6,532,536 B1 | * | 3/2003 | Sidie ............................. | 713/1 |
| 6,584,505 B1 | * | 6/2003 | Howard et al. ............. | 709/225 |
| 6,820,125 B1 | * | 11/2004 | Dias et al. ................... | 709/229 |
| 6,912,582 B1 | * | 6/2005 | Guo et al. ................... | 709/229 |

* cited by examiner

*Primary Examiner*—Saleh Najjar
*Assistant Examiner*—Michael Y. Won

(57) ABSTRACT

An automated login process is provided for a user connecting to a first server of multiple servers that are connected via a computer network. The server receives a connection to the user via a client data terminal, receives an identifier associated with a second server of the multiple servers, and authenticates the user based on the identifier.

16 Claims, 2 Drawing Sheets

METHOD AND APPARATUS FOR PROVIDING AN AUTOMATED LOGIN PROCESS

TECHNICAL FIELD

The present invention relates generally to Internet electronic commerce, and in particular to registration with a web server by a user visiting the web server.

BACKGROUND OF THE INVENTION

A typical electronic commerce (eCommerce) web site allows a consumer, logging onto the web site from a client data terminal, such as a personal computer (PC) or a workstation, to purchase goods or services offered by the company maintaining the web site. Such a web site typically requires that the consumer login with the web server that is actually hosting the site. The "login" process usually means that the consumer provide registration information, such as a name, address, telephone number, and electronic mail (email) address, before the consumer is able to access the services offered by the web site. The consumer's registration information is stored in a database maintained by the host server, and in response to receiving the information the host server typically provides the consumer with a unique personal identifier, such as a personal identification number (PIN), that is associated with the stored information. When the consumer subsequently revisits the web site, the PIN can serve to authenticate the user instead of requiring the user to fully re-register.

It is not uncommon for an eCommerce web site to include one or more computer input marks, such as an icon or a textual phrase, that allows a consumer visiting the web site to connect to a second, perhaps unrelated web site hosted by a second web server. Typically, when the second web site is another eCommerce web site, the consumer is again required to login at the second web site, again providing registration information and receiving, in return, a second personal identifier. When, at a future time, the consumer again returns to the second web site via the first web site, the consumer is again required to login to the second web site, providing at least the second personal identifier if not additional registration information. Requiring the consumer to repeatedly provide extensive information every time a consumer links to an eCommerce web site via another eCommerce web site is cumbersome and inconvenient to the consumer.

In order to avoid such repetitive logins, some web servers store on a client data terminal (the consumer's PC) small data files, (also referred to as "objects") known as "cookies." When a user of a client data terminal first links to a web site, the host server obtains registration information from the consumer and stores the registration information and/or an assigned personal identifier in a cookie that is stored on the client data terminal. When the user of the client data terminal subsequently links to the web site, the host server locates the cookie on the client data terminal and retrieves the registration information and/or personal identifier from the cookie, eliminating the need for the user to again provide the information or identifier. The use of cookies by host servers has become so widespread that issues of consumer privacy and the storage of cookies on consumers' computers are topics of heated public debate. Some consumers even attempt to block the storage of cookies on their computers or disable cookies already stored there. Furthermore, cookies do not address the needs of the mobile user who often has access to computers spread over distances.

Therefore, a need exists for a method and apparatus whereby a consumer can link to a second web site through a first web site and access the services of the second web site without being required to provide registration information or a personal identifier and without the use of a "cookie."

SUMMARY OF THE INVENTION

An automated login process is provided for a user connecting to a server, wherein the server is a first server of multiple servers that are connected via a computer network. The server receives a connection to the user via a client data terminal, receives an identifier associated with a second server of the multiple servers, and authenticates the user based on the identifier. By authenticating the user based on the identifier, the need for the user to input registration information or a personal identifier as part of the login process is eliminated.

DETAILED DESCRIPTION OF THE INVENTION

Figure 1:
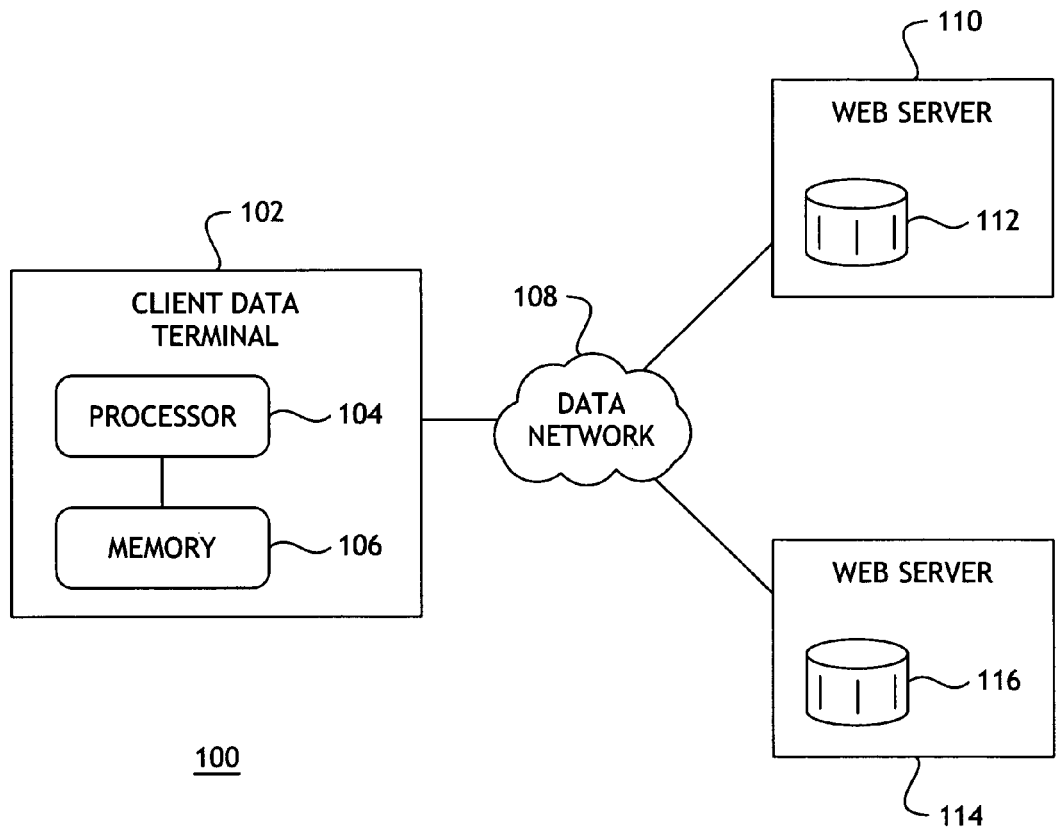
FIG. 1 is a block diagram of a computer data system in accordance with the present invention.
Figure 2:
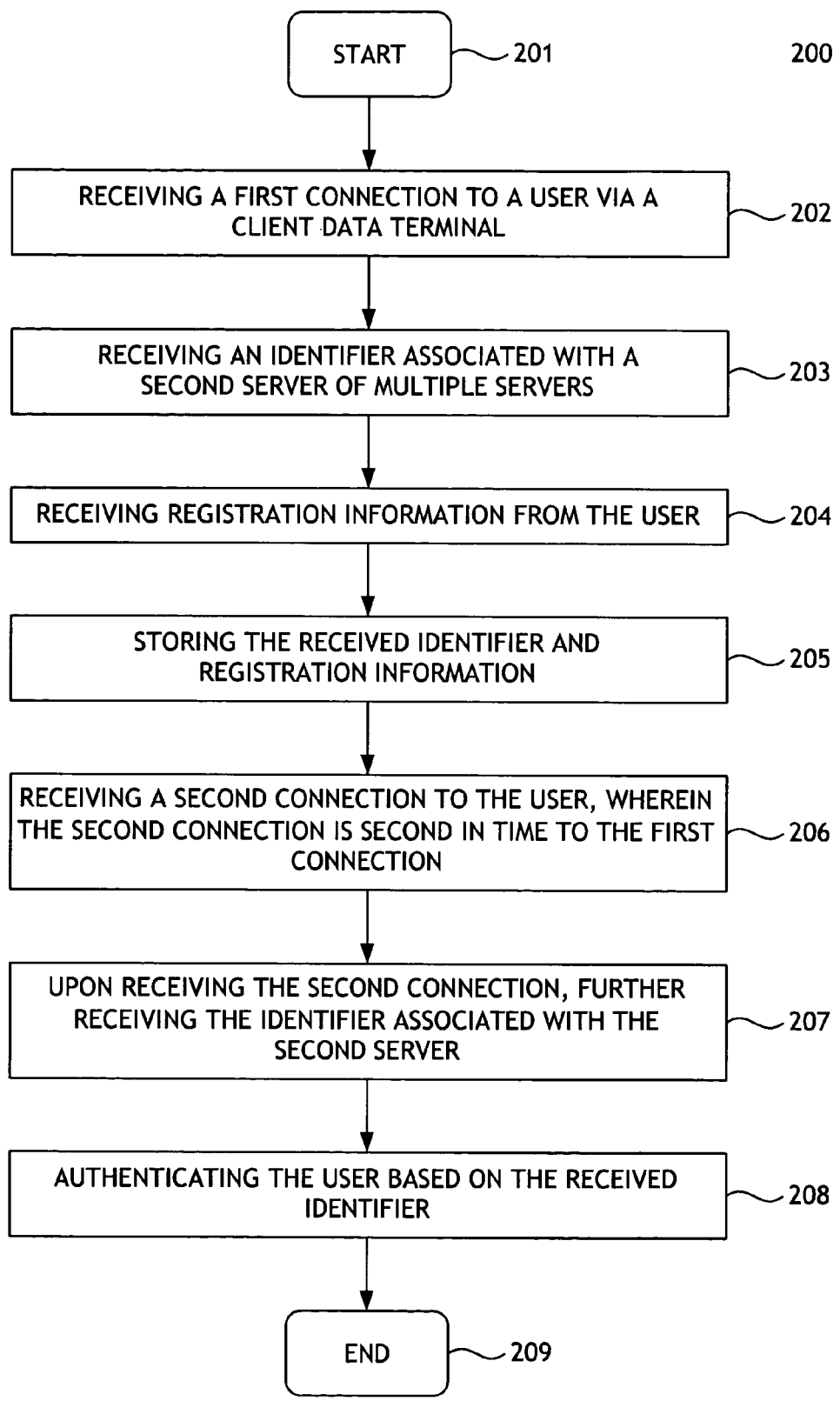
FIG. 2 is a logic flow diagram of the steps executed by a web server in providing an automated login process in accordance with the present invention.

The present invention can be more fully understood with reference to FIGS. 1 and 2. FIG. 1 is a block diagram of a computer data system 100 in accordance with the present invention. A user at a client data terminal 102, such as a personal computer or a workstation, accesses each of multiple web servers 110, 114 (two shown) via a data network 108 such as the Internet. Each of web servers 110, 114 can be an HP 9000 K-series server or an HP 9000 Enterprise server available from Hewlett-Packard Company or any other web server or equivalent thereof, including for example, a network of computers or processors that are linked together, which is known art. Each of the web servers 110, 114 is typically operated by, or at the behest of, a provider of goods or services and includes a registration system whereby a prospective purchaser of goods or services, or a previous customer (all of which are hereinafter referred to as a "user") connects to the server and registers with the server and whereby the server authenticates the user upon subsequent visits by the user to the server. Each web server 110, 114 stores one or more user interfaces, such as a web page, in a memory associated with the server. Each user interface provides a means by which a server 110, 114 can exchange information with the user when the user is connected to the server via client data terminal 102.

Client data terminal 102 includes a processor 104 coupled to a memory 106 that stores instructions and programs, including a web browser application, that are executed by the processor. A user of client data terminal 102 establishes a connection to a web server 110, 114 by activating the web browser stored in memory 106 and inputting a uniform resource locator (URL) corresponding to an Internet Protocol (IP) address of a web server 110, 114. Using known techniques and communication protocols, the web browser then connects, via data network 108, with the web server corresponding to the input URL. Many other methods are known for instructing a web browser to connect a client data terminal to a web server and may be used herein without departing from the spirit and scope of the present invention.

When a user of client data terminal 102 connects to a web server, such as web server 110, the user is typically requested by the web server to "login." The login process typically requires that the user provide to the server (i.e., server 110) registration information, such as the user's name, post office address, telephone number, and electronic mail (email) address, or provide a personal identifier by which server 110 can authenticate the user. In one embodiment of the present invention, when the user connects to server 110, the server conveys to the user, via client data terminal 102, a user interface. Included in the user interface is a request that the user login, that is, provide a personal identifier or registration information, and appropriate data fields for the input of the requested information. The user then inputs the appropriate data into the appropriate data fields and conveys the data back to server 110. When the data then received by server 110 includes registration information, server 110 stores the received data, preferably in a user profile that server 110 creates in a registration database 112 that is included in or connected to the server.

Upon receiving registration information from the client data terminal, server 110 generates a personal identifier that typically includes one or more symbols or alphanumeric values, such as a personal identification number (PIN) or password, that is associated with the registration information just received by server 110 from the user. Alternative embodiments might generate personal identifiers that are comprised of other combinations of words, phrases or the like. Server 110 stores the personal identifier, preferably in the user's profile, which is a data file in registration database 112, and conveys the personal identifier to the user. Use of the personal identifier thereafter allows the user to expedite the login process when the user subsequently connects to server 110, wherein the user need only provide the personal identifier to server 110 instead of again providing registration information. Upon receiving the personal identifier from the user during such subsequent connections, server 110 then authenticates the user by searching for, and locating, a matching personal identifier in registration database 112. A match between a stored personal identifier and the personal identifier sent to the server 110 by a putative user, provides a basis for the server to consider the user who supplied the personal identifier to be the same person to whom the personal identifier was first supplied and identified by the data that the user provided during the registration process. By way of a personal identifier match, the user is considered to be authenticated.

In the present invention, included in one of the one or more user interfaces of web server 110 is a computer input mark, such as an icon or a textual phrase, that includes a hyperlink to a second web server, such as web server 114. Selection of the computer input mark by the user causes the web browser running on client data terminal 102 to establish a connection to the second web server, that is, server 114. Web server 110 is affiliated with web server 114 in the sense that web server 110 provides a means by which a user visiting web server 110 can connect to web server 114. In the prior art, in the absence of a "cookie," each time the user connects to server 114 via the hyperlink of server 110, the user is required to login to server 114 by providing either registration information or a personal identifier. The present invention eliminates the need for the user to provide any login information when connecting to server 114 via the hyperlink of server 110 after going through a one-time registration process.

Computer input marks are well known in the art. Computer input marks typically include an underlying URL associated with another file in the web server or with a file in another web server. Computer input marks typically further include an underlying instruction, executed by a web browser running on a client data terminal, to establish a connection between the client terminal and the server and file associated with the underlying URL. In one embodiment of the present invention, the computer input mark of the user interface of web server 110 further includes an underlying personal identifier, which personal identifier was assigned to the user by web server 110, and an underlying provider identifier associated with web server 110. The provider identifier allows the web server associated with the underlying URL, that is, web server 114, to identify the affiliated web server that served as the source of the hyperlink, that is, web server 110. When the user of client data terminal 102 selects the computer input mark of the user interface of web server 110, processor 104 of client data terminal 102 establishes a connection between the terminal and server 114 via data network 108, and conveys to server 114 the personal identifier and the provider identifier associated with server 110.

In an alternative embodiment of the present invention, when the user registers with web server 110, web server 110 may generate a user identifier that identifies both server 110 and the user, that is, which functions as both a provider identifier and a personal identifier. In the alternative embodiment, the computer input mark includes an underlying user identifier, instead of the personal identifier and the provider identifier. When the user of client data terminal 102 selects the computer input mark of the user interface of web server 110, processor 104 of client data terminal 102 establishes a connection between the terminal and server 114 via data network 108, and conveys to server 114 the user identifier associated with server 110.

When the user of client data terminal 102 connects for the first time to web server 114 via the computer input mark of the user interface of web server 110, the user goes through a login process on server 114 that is similar to the login process described above with respect to web server 110. Preferably, server 114 conveys to the user, via client data terminal 102, a user interface that includes a request that the user login, that is, provide a personal identifier or registration information. The user interface further includes data fields whereby the user can input the requested information. The user then inputs the requested data (i.e., the registration information when logging onto server 114 for the first time) into the user interface and conveys the data to server 114. Server 114 stores the registration information, along with the personal identifier and provider identifier associated with server 110, in a registration database 116 included in or connected to server 114. Preferably, prior to storing the personal identifier and provider identifier in registration database 116, server 114 requests and obtains the user's consent to use information obtained from server 110. Server 114 also generates and stores a personal identifier that is associated with the user's registration information. Preferably the registration information, the personal identifier and provider identifier associated with server 110, and the personal identifier generated by server 114 are all stored in a user profile that is created by server 114 in registration database 116. Server 114 also conveys the personal identifier generated by server 114 to the user.

After the user leaves web server 114, the present invention provides a transparent login process for the user when he or she subsequently reconnects to web server 114 via the computer input mark included in the user interface of web server 110. When the user subsequently reconnects to server 114 via the computer input mark, server 114 again receives from client data terminal 102 the personal identifier and provider identifier that underlie the computer input mark. Server 114 then searches registration database 116 for a personal identifier and provider identifier that match the received identifiers, which matching identifiers are stored in the user's profile. Upon locating the previously stored, matching identifiers, server 114 authenticates the user and permits the user access to one or more services provided by the server. Server 114 can also retrieve, from database 116, the user's stored registration information and personal identifier generated by server 114 based on the personal identifier and provider identifier conveyed by terminal 102.

For example, and merely for the purpose of illustrating the principles of the present invention, suppose that server 110 generates, and conveys to a user, a personal identifier 'X' when the user first registers with the server. A computer input mark of a user interface of server 110 includes a hyperlink to server 114 and further includes the personal identifier 'X' and a provider identifier 'Y' that is uniquely associated by server 114 with server 110. When the user then connects to server 114 via the computer input mark of server 110, the user's client data terminal 102 conveys to server 114 the personal identifier 'X' and the provider identifier 'Y.' Server 114 then requests and receives registration information from the user and stores the registration information, along with the personal identifier 'X' and the provider identifier 'Y,' in a profile of the user in registration database 116. Server 114 also generates a personal identifier 'Z' that is also stored in the user's profile in database 116.

The next time that the user connects to server 114 via the computer input mark of server 110, the user's client data terminal 102 again conveys to server 114 the personal identifier 'X' and the provider identifier 'Y.' Upon receiving the reconveyed identifiers 'X' and 'Y,' server 114 searches registration database 116 for a stored 'X' and a corresponding stored 'Y.' Upon locating the stored 'X' and 'Y' in the user's profile in database 116, server 114 authenticates the user and permits the user access to one or more services provided by server 114.

By authenticating the user based on the personal identifier and provider identifier conveyed to server 114 by client data terminal 102, the present invention eliminates the need for the user to provide any data when logging onto server 114 after going through a one-time registration process. System 100 thereby presents the user with a seamless transition from server 110 to server 114, eliminating any need for the user to stop and provide any login information such as registration information or a personal identifier.

FIG. 2 is a logic flow diagram 200 of a method for providing automated registration for a user connecting to a server, wherein the server comprises a first server of multiple servers that are connected via a computer network. The method starts (201) when the first server receives (202) a connection from the user for a first time. In the present invention, the connection is established as a result of the user selecting a computer input mark of a second server of the multiple servers, which computer input mark includes a hyperlink to the first server. Upon receiving the connection, the first server requests that the user to login. As a part of the login process, the first server receives (203) an identifier associated with the second server, which identifier preferably identifies both the user and the second server. Alternatively, the server may receive both a provider identifier associated with the second server and a personal identifier assigned to the user by the second server. The first server further receives (204) registration information from the user. The first server then stores (205) the received identifier and the registration information, preferably in a user profile that the first server creates in an associated registration database.

Subsequent, in time, to receiving and storing the identifier and the registration information provided by the user, the first server receives (206) a second connection with the user as a result of the user again selecting the computer input mark of the second server. Upon receiving the second connection, the first server further receives (207) the identifier associated with the second server, or alternatively receives both the provider identifier associated with the second server and the personal identifier assigned to the user by the second server. The first server then authenticates (208) the user based on the identifier, preferably by locating a matching identifier that was previously stored in the registration database, and the logic flow ends (209). Preferably the step of authentication (208) includes the steps of authenticating the user based on the identifier and allowing a user access to a service provided by the first server.

In sum, the present invention provides an automated login process for a user logging onto a host server via an affiliated server. When the user first logs onto the host server via the affiliated server, the host server is provided, by the user's client data terminal, a provider identifier and a personal identifier associated with the affiliated server. The provider identifier and the personal identifier are then stored by the host server in a registration database associated with the host server, along with registration information provided by the user. When the user subsequently connects to the host server via the affiliated server, the user's client data terminal again provides the provider identifier and personal identifier to the host server. The host server is then able to authenticate the user by matching the received provider identifier and personal identifier with the provider identifier and personal identifier stored in the registration database, without requiring any data to be input by the user. By eliminating the need for the user to input any data, the present invention provides a login process that is seamless and transparent to the user, yet does not use a cookie.

While the present invention has been particularly shown and described with reference to particular embodiments thereof, it will be understood by those skilled in the art that various changes in form and details may be made therein without departing from the spirit and scope of the present invention.

What is claimed is:

1. A method for providing an automated login for a user connecting to a server, wherein the server comprises a first server of a plurality of servers that are connected via a computer network, the method comprising steps of:

receiving a connection to the user via a client data terminal;

accessing the first server by the user after being authenticated;

selecting from the first server a computer input mark to a second server and assigning a first identifier and underlying second identifier associated with the first server of the computer input mark;

accessing the services of the second server from the user and based on the received identifiers if both identifiers are authenticated; and authenticating, without the use of cookie, the user and the first server based on the first and second identifiers and allowing access to the second server by linking the user to the second server through the first server and without requesting a cookie from the client if both identifiers are authenticated to eliminate the need for the user to provide separate login information and to eliminate the use of cookies when connecting to the second server via the input mark.

2. The method of claim 1, wherein the second identifier comprises a provider identifier associated with the second server and the first identifier comprises a personal identifier assigned to the user by the second server.

3. The method of claim 1, wherein the step of authenticating the user comprises a step of allowing a user access to a service provided by the first server after an initial registration by the user.

4. The method of claim 2, wherein the step of receiving a connection comprises a step of receiving a second connection to a user via a client data terminal, wherein the step of selecting from the first server a computer input mark comprises a step of receiving, during the second connection, a provider identifier associated with a second server of the plurality of servers and a step of receiving, during the second connection, a personal identifier assigned to the user by the second server, and further comprising steps of:
- receiving a first connection to the user via a client data terminal, wherein the first connection is first in time relative to the second connection;
- receiving, during the first connection, an identifier associated with the second server;
- receiving registration information from the user;
- storing the identifier and the registration information; and
- wherein the step of authenticating the user comprises a step of matching the stored identifier with the identifier received during the second connection.

5. The method of claim 4, wherein the identifier received during the first connection and the identifier received during the second connection each comprises a provider identifier associated with a second server and a personal identifier assigned to the user by the second server.

6. The method of claim 4, wherein the step of storing comprises steps of:
- creating a user profile; and
- storing the identifier and the registration information in the user profile.

7. The method of claim 4, further including steps of:
- requesting, during the first connection, a consent of the user to use the identifier associated with the second server; and
- receiving the requested consent.

8. The method of claim 4, wherein the registration information comprises at least one of a user name, user post office address, user telephone number, and user electronic mail address.

9. The method of claim 1, further comprising a step of assigning, by the first server and during a first connection, a personal identifier to the user.

10. A method for providing an automated login for a user logging onto a host web site, the method comprising steps of:
- receiving a connection to a user via an affiliated web site;
- accessing a first server by the user after being authenticated;
- selecting from a host web site a computer input mark having a hyperlink to a second web site and assigning a personal identifier and an underlying provider identifier associated with the host web site of the computer input mark;
- allowing the user access to the host web site; and
- accessing the services of a second server by linking the user to the second server through the first server and based on the received identifiers if both identifiers are authenticated wherein the need for the user to provide separate login information and the use of a cookie between the first server and second server is eliminated when connecting to the second web site via the hyperlink of the input mark.

11. The method of claim 10, wherein the personal identifier is provided to the second web site via a transparent login process after the user disconnects and then later reconnects to the second web site.

12. The method of step 10, wherein the step of receiving a connection comprises a step of receiving a second connection of a user via an affiliated web site, wherein the step of selecting from the host web site a computer input mark comprises a step of receiving, during the second connection, an identifier associated with the affiliated web site, and further comprising steps of:
- receiving a first connection of the user via the affiliated web site, wherein the first connection is first in time relative to the second connection;
- receiving, with respect to the first connection, registration information from the user;
- receiving, with respect to the first connection, an identifier associated with the affiliated web site; and
- storing the registration information and identifier received with respect to the first connection.

13. The method of claim 12, wherein the identifier received during the first connection and the identifier received during the second connection each comprises a provider identifier associated with the affiliated web site and a personal identifier assigned to the user by the affiliated web site.

14. The method of claim 12, wherein the registration information and identifier received with respect to the first connection is stored in a database, and wherein the step of allowing comprises steps of:
- searching the database for an identifier that matches the identifier received with respect to the second connection; and
- when a matching identifier is located, allowing the user access to the host web site.

15. A server comprising:
- a means for receiving a first connection and a second connection to a client data terminal, wherein the first connection is first in time relative to the second connection;
- a means for accessing the first server by the user after being authenticated;
- a means for selecting from the first connection a computer input mark having a hyperlink to the second connection;
- a means for receiving registration information during the first connection from a user of the client data terminal;
- a means for receiving a personal and a provider identifier each associated with an affiliated server during the first connection, which affiliated server was visited by the user prior to the server receiving the first connection to the client data terminal;
- a means for storing the received registration information and the personal identifier;
- a means for receiving the provider identifier during the second connection; and
- a means for authenticating the user during the second connection based on the personal and provider identifiers received during the second connection and allowing access to the second connection by linking the user to the second server through the first server and if both identifiers are authenticated to eliminate the need for the user to provide separate login information when connecting to the second connection via the hyperlink of the input mark and to eliminate the use of cookies during authentication and connection.

16. The server of claim 15, wherein the personal identifier is provided to the second connection via a transparent login process after the user disconnects and then later reconnects to the second connection.

* * * * *

UNITED STATES PATENT AND TRADEMARK OFFICE
CERTIFICATE OF CORRECTION

| | | |
|---|---|---|
| PATENT NO. | : 7,093,019 B1 | Page 1 of 1 |
| APPLICATION NO. | : 09/718583 | |
| DATED | : August 15, 2006 | |
| INVENTOR(S) | : John A. Bertani et al. | |

It is certified that error appears in the above-identified patent and that said Letters Patent is hereby corrected as shown below:

In column 7, line 62, in Claim 12, delete "step 10" and insert -- claim 10 --, therefor.

Signed and Sealed this

Eighth Day of December, 2009

David J. Kappos
*Director of the United States Patent and Trademark Office*